Nov. 4, 1969   D. P. WITTEMAN   3,475,966
APPARATUS FOR DETERMINING FEEDING RATE
OF GRAIN DRILLS OR THE LIKE
Filed April 19, 1968   2 Sheets-Sheet 1
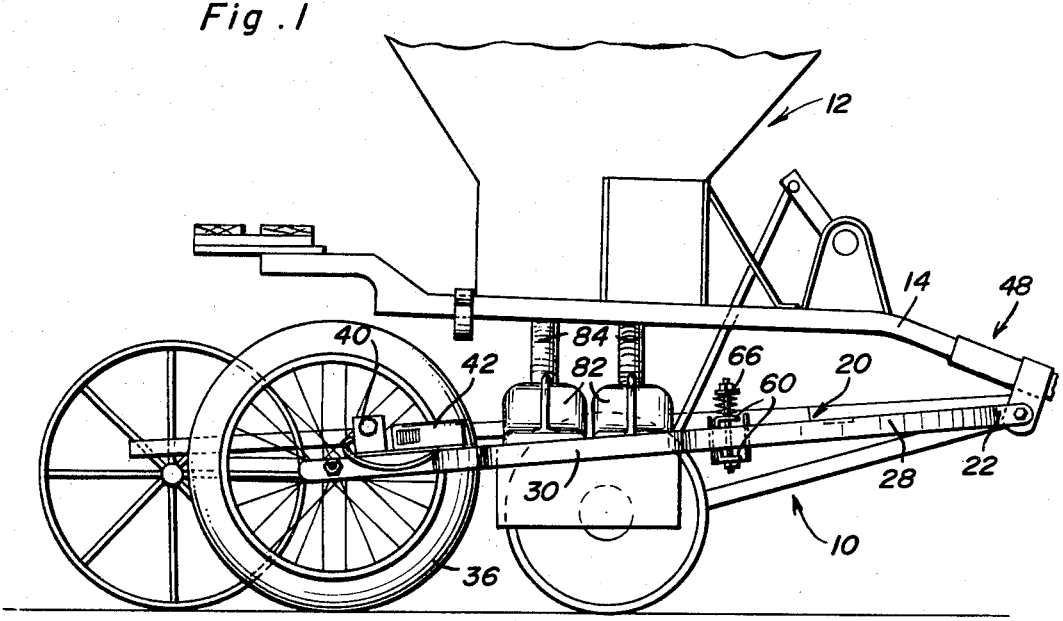
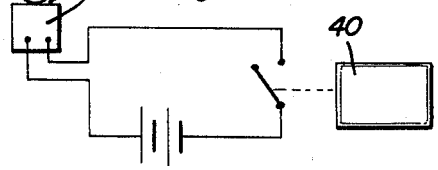
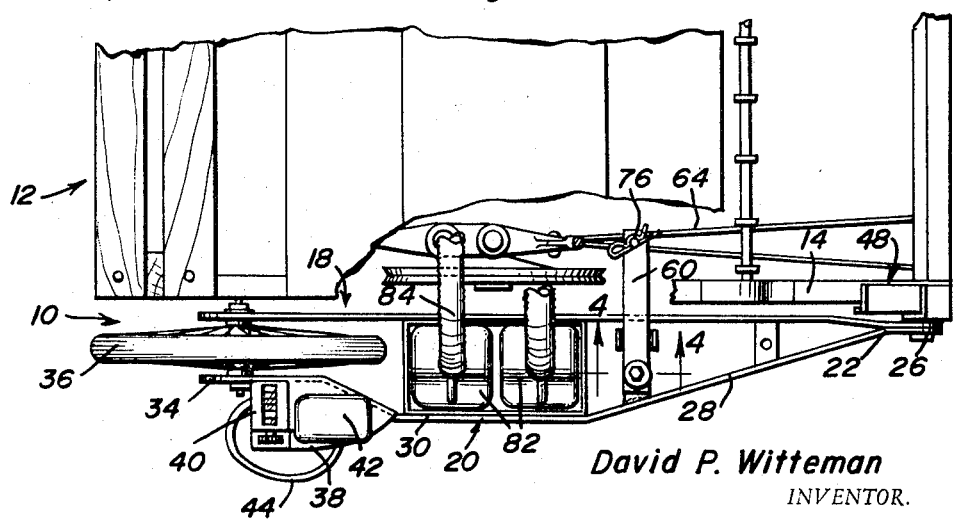
David P. Witteman
INVENTOR.

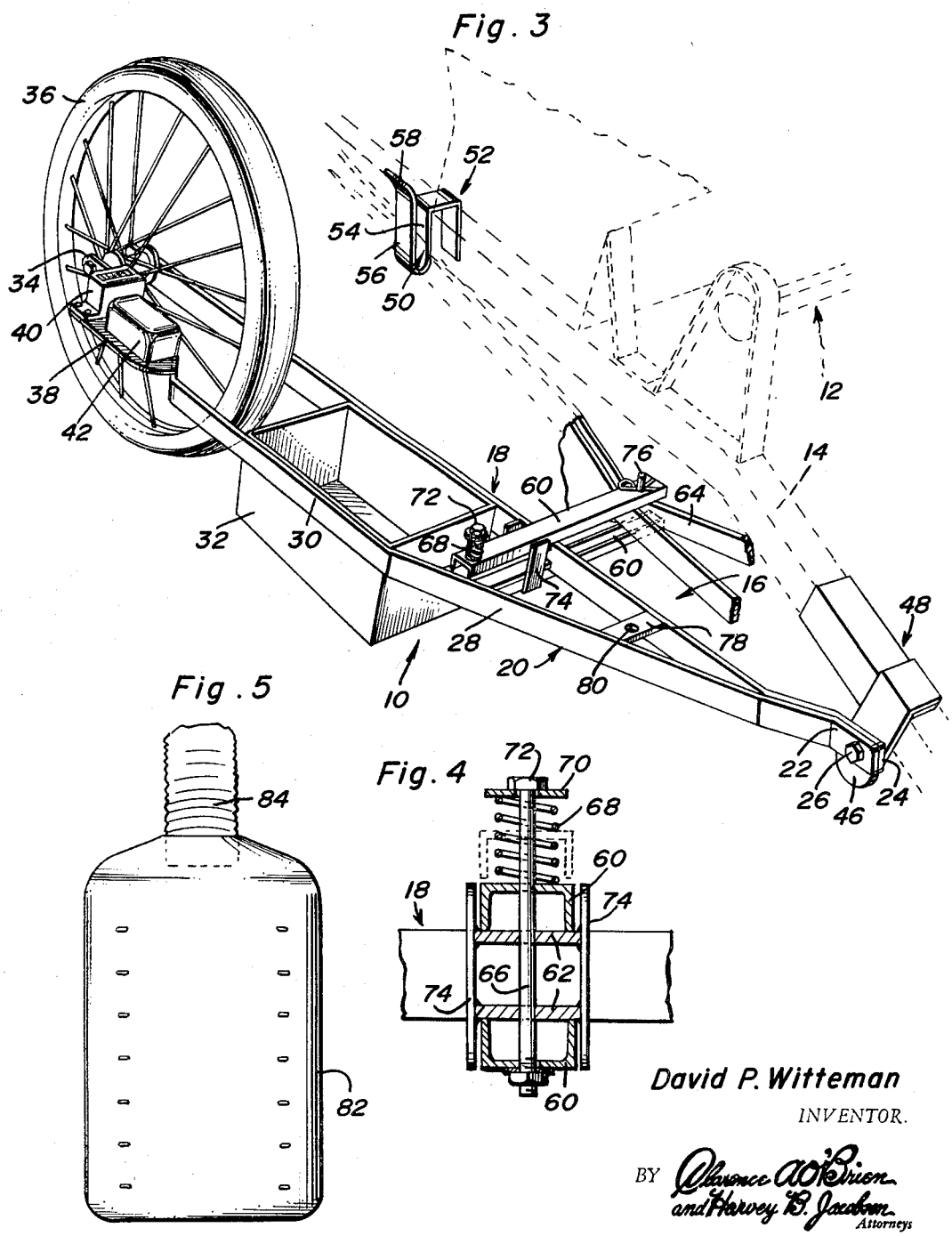

United States Patent Office 3,475,966
Patented Nov. 4, 1969

3,475,966
APPARATUS FOR DETERMINING FEEDING RATE OF GRAIN DRILLS OR THE LIKE
David P. Witteman, P.O. Box 484,
Mohall, N. Dak. 58761
Filed Apr. 19, 1968, Ser. No. 722,632
Int. Cl. G01f 11/00, 23/00
U.S. Cl. 73—432          10 Claims

ABSTRACT OF THE DISCLOSURE

An attachment for a grain drill pivotally mounted on the side beam of the drill for movement between a lowered ground contacting operative position and a raised inoperative position. The attachment includes calibrated containers which receive the endmost feed tubes for the introduction of the material being fed. The attachment also incorporates a ground measuring wheel and a cooperating counter which sounds an alarm upon the completion of a predetermined run.

The instant invention generally relates to grain drills or the like, and is more particularly concerned with an attachment for accurately calibrating the dispensing rate of a drill under actual field conditions.

The necessity for checking a drill setting arises because of variations in both the field roughness and the speed travelled, as well as variations in the size, weight and texture of the various types of material being dispensed, whether seed, fertilizer or chemicals. The instant invention contempletes the checking of a grain drill setting or determining the feeding rate of a drill through the utilization of an attachment which receives the flowing material in a calibrated container as the drill is traversing a predetermined distance, the length of which is measured through a combination ground engaging measuring wheel and rotation counter which, upon traversing the predetermined distance, activates a battery powered alarm so as to signal the driver. The driver is then only required to check the calibrated container so as to ascertain whether or not the desired feeding rate is being achieved. Once the desired feeding rate is achieved, the attachment is moved to an inoperative position and the drilling continues.

Various objects of the instant invention include the provision of a calibrating device which can be mounted directly on the drill and selectively moved from operative to inoperative position, the provision of a device whereby an exact indication of the feeding rate over a predetermined area can be ascertained, and the provision of a device for determining the feeding rate which is of a structurally unique construction capable of being mounted so as to not incumber the normal operation of the drill.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial side elevational view of a grain drill with the device of the instant invention mounted thereon in operative position;

FIGURE 2 is a plan view of the mounted attachment;

FIGURE 3 is a perspective view of the mounted attachment;

FIGURE 4 is an enlarged cross-sectional detail taken substantially on a plane passing along line 4—4 in FIGURE 2;

FIGURE 5 is an enlarged elevational view of one of the calibrated containers with the discharge end of a feed tube therein; and FIGURE 6 is a schematic diagram of the distance indicating system.

Referring now more specifically to the drawings, reference numeral 10 is used to generally designate the attachment of the instant invention utilized for determining feeding rates of grain drills or the like, one such machine being illustrated in the drawings and generally designated by reference numeral 12.

The attachment 10 is to be positioned adjacent one side of the drill 12 and mount on a frame beam 14 thereof so as to parallel the side of the drill 12 and move along therewith. Basically, the attachment 10 includes a rigid frame 16 including an inner substantially straight frame beam 18 and an outer frame beam 20 generally coextensive with the inner frame beam 18 along the full length thereof. The outer beam 20 includes a forward portion 22 engaged against the forward end portion 24 of the inner beam 18 and forming a common forward frame end rigid therewith which is offset slightly inward toward the drill or machine 12 and receives a pivot bolt 26 therethrough. The outer beam 20, rearward from the forward end portion 22 thereof, diverges outwardly from the straight inner beam, as indicated by reference numeral 28. Rearward of the outwardly diverging portion 28, the outer beam 20 proceeds rearwardly, for a portion of the length thereof indicated by reference numeral 30, in parallel laterally spaced relation to the inner beam 18 with the beam 18 and beam section 30 mounting therebetween an enlarged open top box 32 in any convenient manner. Rearward of the beam section 30, the outer beam 20 angles inwardly and terminates in a rearwardly directed portion 34 which parallels the rear end portion of the inner beam 18 in sufficient spaced relation thereto so as to rotatably mount an enlarged ground engaging measuring wheel 36 therebetween on an appropriate frame beam supported axle. This rear portion 34 of the outer beam 20 additionally includes an outwardly directed horizontal platform 38 rigidly affixed thereto as by welding.

The platform 38 is utilized to mount a conventional rotation counter or the like 40 which is cooperatively engaged with the ground measuring wheel 36 so as to, depending upon the setting of the unit 40, close a switch upon the travelling of a predetermined distance, the closed switch in turn activating a conventional battery powered signal or alarm 42 also mounted on the platform 38 and engaged with the counter 40 by an appropriate conductor cable 44.

The forward end of the attachment frame 16 is, through the pivot bolt 26, rotatably mounted for movement in a vertical direction to the depending ear 46 of an angular bracket 48 rigidly affixed, as by bolting or welding, to the adjoining side beam 14 of the drill 12. The attachment 10 pivots between a lowered operative position, illustrated in the drawings, and a raised inoperative stored position wherein the inner beam 18 is received within an upwardly directed seat 50 defined within a second bracket 52 affixed to the drill side beam 14 rearward of the box 32. The seat 50 is defined by inner and outer parallel legs 54 and 56 with the inner leg having an outwardly curled upper lip 58 so as to facilitate a downward sliding of the inner beam 18 into the seat 50 after an initial raising of the attachment frame above the lip 58. To facilitate the seating of the frame means, the outer leg 56 of the seat 50 may in fact be slightly flexible, as long as sufficient rigidity is present for retaining the inserted frame beam 18. The bracket 52 itself is of course rigidly affixed to the drill beam 14.

In order to affix the attachment 10 in its lowered operative position with the distance measuring wheel 36 in positive engagement with the ground, a pair of upper and lower cross arms 60 are provided. These cross arms 60 are pivotally pinned to the upper and lower faces of a pair of vertically spaced parallel beam braces 62 which extend between the frame beams 18 and 20 just forward of the box 32. These braces 62 are generally coextensive with the upper and lower edges of the beams 18 and 20 whereby the upper and lower cross arms 60 can extend both above and below the inner frame beam 18 as best seen in FIGURE 3 for pinned engagement with the adjacent drill disk or hoe pressure arm 64. It will be noted that the arms 60 are pinned to the braces 62 adjacent the outer frame beam 20 by means of an elongate pivot bolt 66 which extends through both arms 60, both braces 62 and a substantial distance above the upper arm 60 for the accommodation of a coiled compression spring 68 between the upper arm 60 and a spring retaining washer 70 on the bolt 66 immediately below the upper headed end 72 thereof.

Fixed to the two transverse braces 62 adjacent the inner frame beam 18 are a pair of opposed vertical retaining plates 74 which extend, on each side of the braces 62, both above and below the upper and lower braces 62 so as to effectively retain the upper and lower cross arms 60 therebetween in parallel relation to the braces 62 for lateral projection beyond the inner beam 18. In this manner, the cross arms 60 are stabilized in operative position for pinned engagement with the adjacent drill pressure arm 64 through any appropriate retaining pin 76 extending through a pair of vertically aligned apertures in the outer ends of the cross arms 60 as well as the portion of the pressure arm 64 received therebetween. When the attachment 10 is to be raised to an inoperative position, the two cross arms 60 are initially moved vertically so as to clear the retaining plates 74, this being possible through the elongated pivot pin 66 and the arm clamping compressible spring 68 thereon, and the arms 60 are swung to a forwardly extended position between the beams 18 and 20 and into both overlying and underlying relation to a third brace 78 provided between the beams 18 and 20 forwardly of the braces 62. The brace 78 includes a central aperture 80 therein which aligns with the pin receiving apertures in the outer ends of the cross arms 60 whereby a pin can be extended through the aligned apertures so as to lock the cross arms 60 between the frame members or beams 18 and 20.

Finally, the attachment 10 is to include a pair of enlarged clear plastic containers 82 which seat side-by-side within the box 32 and are calibrated, normally, so as to present an indication of the feeding rate of the drill 12 on a per acre basis. These containers 82 are provided with an open top into which the lower discharge ends of the adjacent feed tubes 84 can either be inserted or secured to whereby the fed material will be deposited directly in the containers 82.

In actual operation, the attachment 10 is unhooked from the bracket seat 50 and pivoted downwardly into operative position with the ground measuring wheel 36 engaging the ground. The cross arms 60 are then moved so as to project perpendicularly beyond the inner frame beam 18 and are pinned to the end pressure arm 64 associated with the end disk or hoe of the drill 12. The feed tubes 84 are then communicated with the interior of the two containers 82, the distance or revolution counter 40 set and the drilling begun. During the drilling, the material will gravity feed into the containers 82 in an obvious manner. Further, it should be appreciated that the adjacent drilling apparatus will not in fact be introducing the material to the row, however, this raises no problem in that the "skipped row" can be handled by a narrow overlapping on the next round. Once the drill has covered the preset distance, the counter will close a switch in the conventional manner with this closing of the switch actuating the battery powered alarm for indicating to the tractor operator that the required distance has been covered. The operator, at this point, stops the drilling operation and checks the level of the material within the containers through the calibrations thereon. If the desired amount is being applied, the attachment can then be returned to the carrying position, the tubes returned to the drilling position and the drilling operation continued in the normal manner, each drill feed setting of course being adjusted to correspond to the measured setting in any suitable manner, such as by the use of an opening divider. If the drill setting, on the contrary, proves inaccurate, the drill setting is changed and a repeat of the above cycle is made.

By securing the attachment 10 to the adjacent drill disk pressure arm in the operative position of the attachment 10, it will be appreciated that a highly accurate determination of the flow rate can be arrived in that upon raising of the pressure arm, as occurs when the drill is being turned at the end of the field, or when for some reason drilling is not desired, not only is the flow cut off, such being a normal function of the drill, but also the distance measuring wheel 36 is raised from the ground, thereby temporarily terminating the distance measuring function of the attachment simultaneously with a termination of the flow. By the same token, upon a lowering of the drill unit, and more particularly the pressure arm 64, to operative position, a simultaneous lowering of the attachment will be effected so as to engage the distance measuring wheel 36.

One other feature of significance is the shock-absorbing nature of the cross arm mounting pin and spring 68 combination which tends to stabilize the attachment and provide for a smoother movement of the attachment along the ground under the downward influence of the pressure arm 64 thereon.

It will of course be recognized that, should one desire to determine the flow rate of only one material, only a single container 82 need be utilized. Further, it will be appreciated that the flow rate of any flowable material, whether seed, fertilizer or chemicals, can be determined through the utilization of the attachment 10 of the instant invention.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. Apparatus for determining the feeding rate of grain drills or the like, said apparatus comprising a frame, said frame having leading and trailing ends, means on the leading end of said frame for pivotally securing said apparatus to a grain drill or the like, ground engageable distance measuring means on said frame rearward of the leading end thereof, said distance measuring means being selectively engageable and disengageable with the ground upon a pivotal lowering and raising of the apparatus frame about the leading end thereof, and container means on said frame for the feeding introduction thereinto of a selected portion of the material being dispensed by the drill or the like.

2. The apparatus of claim 1 including means operatively associated with the ground engageable distance measuring means for providing a signal upon the covering of a predetermined distance.

3. The apparatus of claim 2 including stabilizing arm means, and means pivotally securing said stabilizing arm means to said frame for movement between a first position projecting generally laterally of the frame for engagement with an adjacent drill or the like and a second position within the confines of the frame.

4. The apparatus of claim 3 wherein said arm means comprises at least one elongated bar-like member, said means pivotally securing said arm means comprising an elongated pivot pin engaged through the frame and one end of the arm means bar-like member, spring means on said pivot pin resiliently biasing said arm member against the frame for selective movement laterally away therefrom, and retainer plate means secured to and projecting from said frame for retaining said arm member in said first position, said arm member clearing said retainer plate means upon a lateral movement of the arm member away from the frame against the biasing force of the spring means whereby a pivotal movement of said arm member can be effected.

5. The apparatus of claim 4 including an open top box mounted on said frame, said container means comprising at least two transparent containers received and supported within said box.

6. The apparatus of claim 5 including support means selectively engaged with said frame toward the trailing end thereof, said support means extending laterally from said frame for engagement with the drill or the like for support of the trailing end of the frame in said raised position.

7. Apparatus for determining the feed rate of grain drills or the like, said apparatus comprising an elongated frame, said frame having a leading end and a trailing end, means on the leading end of said frame and on said frame rearward of said leading end for suspending said apparatus from an adjacent grain drill or the like, the means rearward of the leading end being selectively releasably for movement of the trailing end of the frame downwardly relative to the leading end, ground engageable distance measuring means on the trailing end of said frame engageable with the ground in a distance measuring manner upon a lowering of the trailing end of said frame, and container means on said frame for the feeding introduction thereinto of a selected portion of the material being dispensed by the drill or the like.

8. The apparatus of claim 6 including stabilizing arm means secured to said frame between the leading and trailing ends thereof, said arm means projecting laterally from the frame in the lowered position thereof for selective engagement with a portion of the adjacent drill or the like.

9. The apparatus of claim 8 wherein the means on the leading end of the frame comprises pivotal connection means, said ground engageable distance measuring means comprising a rotatably mounted wheel and an operatively connected distance counter.

10. In combination with a material dispensing drill including a side beam and an adjacent tool pressure bar, an attachment for determining the feeding rate of the drill, said attachment comprising a frame including leading and trailing ends, means pivotally mounting the leading end of said frame to the beam of the drill for movement of the frame between a lowered and an elevated position, said frame generally paralleling said beam, ground engageable distance measuring means mounted on said frame rearward of the leading end thereof, means engageable between said frame and said beam toward the trailing end of said frame for supporting said frame in an elevated position on said beam with the ground engageable distance measuring means out of contact with the ground, and means selectively engageable between said frame and said pressure arm in the lowered position of said frame whereby pressure is transmitted from the pressure arm through the frame and to the ground engageable distance measuring means.

References Cited
UNITED STATES PATENTS 3,129,844    4/1964    Madison.
1,967,847    7/1934    Wachendorff _____ 73—3

S. CLEMENT SWISHER, Primary Examiner

U.S. Cl. X.R.

73—1